UNITED STATES PATENT OFFICE.

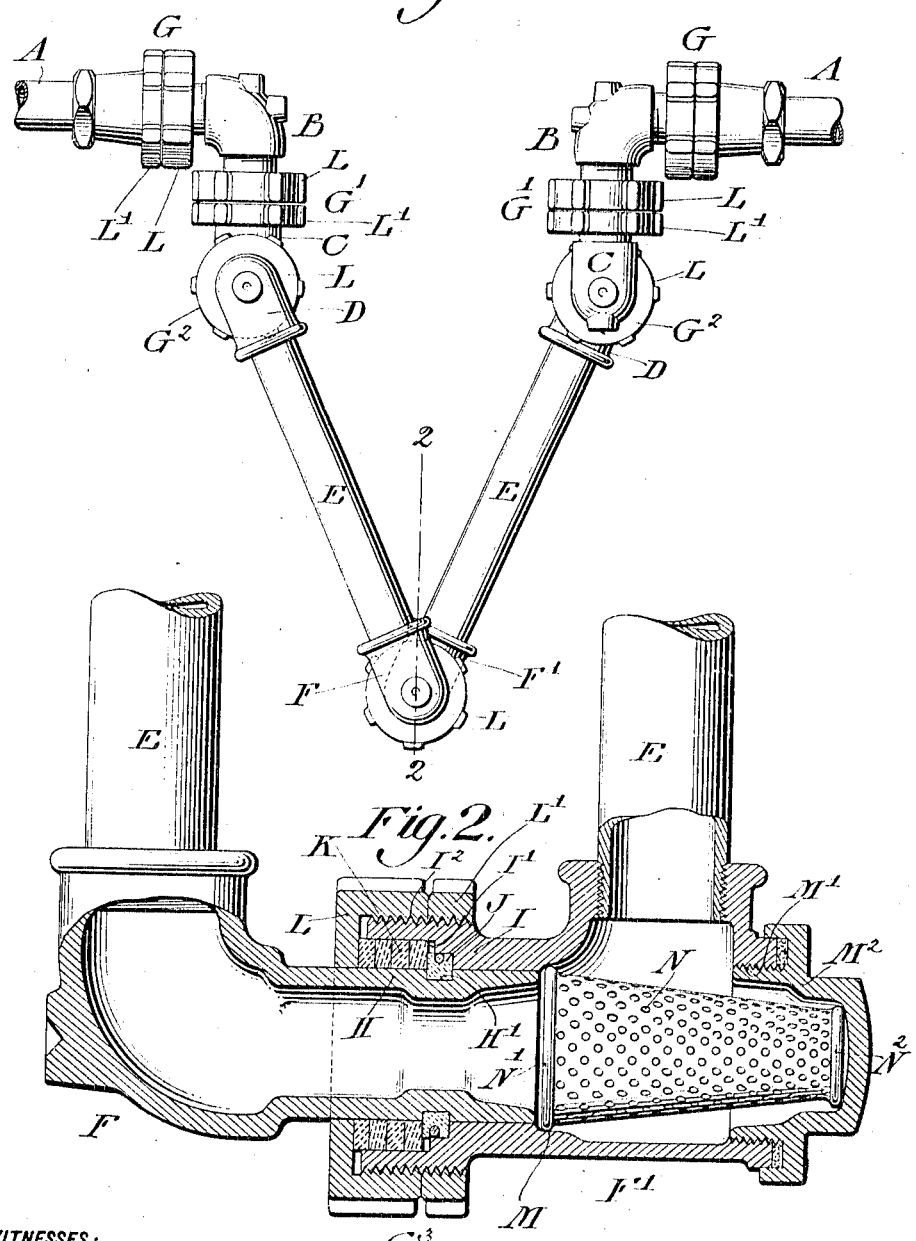

LAMBERT J. BORDO, OF PHILADELPHIA, PENNSYLVANIA.

STRAINER-SECTION FOR FLEXIBLE METALLIC PIPES.

986,678.

Specification of Letters Patent. Patented Mar. 14, 1911.

Application filed May 23, 1907. Serial No. 375,213.

*To all whom it may concern:*

Be it known that I, LAMBERT J. BORDO, a citizen of the United States of America, residing in the city and county of Philadelphia, in the State of Pennsylvania, have invented a certain new and useful Improvement in Strainer-Sections for Flexible Metallic Pipes, of which the following is a true and exact description, reference being had to the accompanying drawings, which form a part thereof.

My invention relates to jointed flexible metallic pipes especially adapted and intended for use in coupling pipes carried by an engine and its tender or by coupling cars, my object being to provide in such or similar pipes a section adapted to include and inclose a strainer in a compact and effective manner.

The nature of my invention will be best understood as described in connection with the drawings in which it is illustrated and in which—.

Figure 1 is a side elevation of the flexible metallic pipe described in my former application and Fig. 2 is a section on the line 2—2 of Fig. 1, illustrating the special strainer section which constitutes the subject matter of my present application.

It will be understood that any elbow section of the flexible pipe can be utilized as the strainer section.

In the drawing, A, A, indicate the ends of the train pipe, B, B; C, C, and F, F¹, being the elbow sections utilized in the make-up of the flexible pipe. The elbow sections D, F, and D, F¹, are shown as connected by straight pipe sections E, E.

G, G; G¹, G¹; G², G², and G³ are the joints by which two abutting elbow sections form a swivel joint with each other, the swivel joints being preferably made up as shown in Fig. 2, one elbow section having an extension H, formed with a groove H¹ in which groove is sprung a metallic ring J. A sleeve section I, of the adjacent elbow fits over the extension H, abutting against the ring J, and having an extension I¹, projecting beyond the ring to receive the metallic packing rings K, which are clamped in place against the ring J, by the clamp ring L, screwing on the threaded outer surface I² and held in place by a jam-nut L¹.

For the purpose of adapting it to receive a strainer I form the elbow section F¹ with an annular seat M, and an oppositely disposed opening M¹ of sufficient size to admit the strainer, said opening being closed by a cap M².

N is the strainer, having a beaded end N¹, which fits on the seat M, and an outer end N², against which the cap M² presses when screwed to place as shown in Fig. 2.

It will be obvious that by the simple construction I have described, I can include a strainer in any one of the elbow sections of my flexible pipe or of pipes having similar constructive features.

The construction is very compact, while at the same time the area of the strainer surface is relatively large. A removable cap M² surrounds and securely holds the small end of the conical strainer N in place, while at the same time the cap M², may be of the same diameter or of but slightly larger diameter than the large end of the strainer N.

Having now described my invention, what I claim as new and desire to secure by Letters Patent is,

An elbow pipe section adapted to form part of a jointed flexible metallic pipe and having an internal seat surrounding the passage through the elbow adjacent one end thereof, and an internally threaded opening M¹ in line with said seat and at the bend of the elbow, in combination with a cap adapted to be threaded into and close said opening and internally hollowed, and a strainer in the form of a hollow truncated cone, the base of which seats against said seat while the smaller end extends into said hollow cap, the parts being so proportioned that the internal diameter of said opening M¹ is not materially greater than the maximum external diameter of the strainer while the portion of the strainer entering said hollow cap is separated from the surrounding portion of the hollow cap by a space.

LAMBERT J. BORDO.

Witnesses:
ARNOLD KATZ
D. STEWART.